United States Patent Office 2,830,849
Patented Apr. 15, 1958

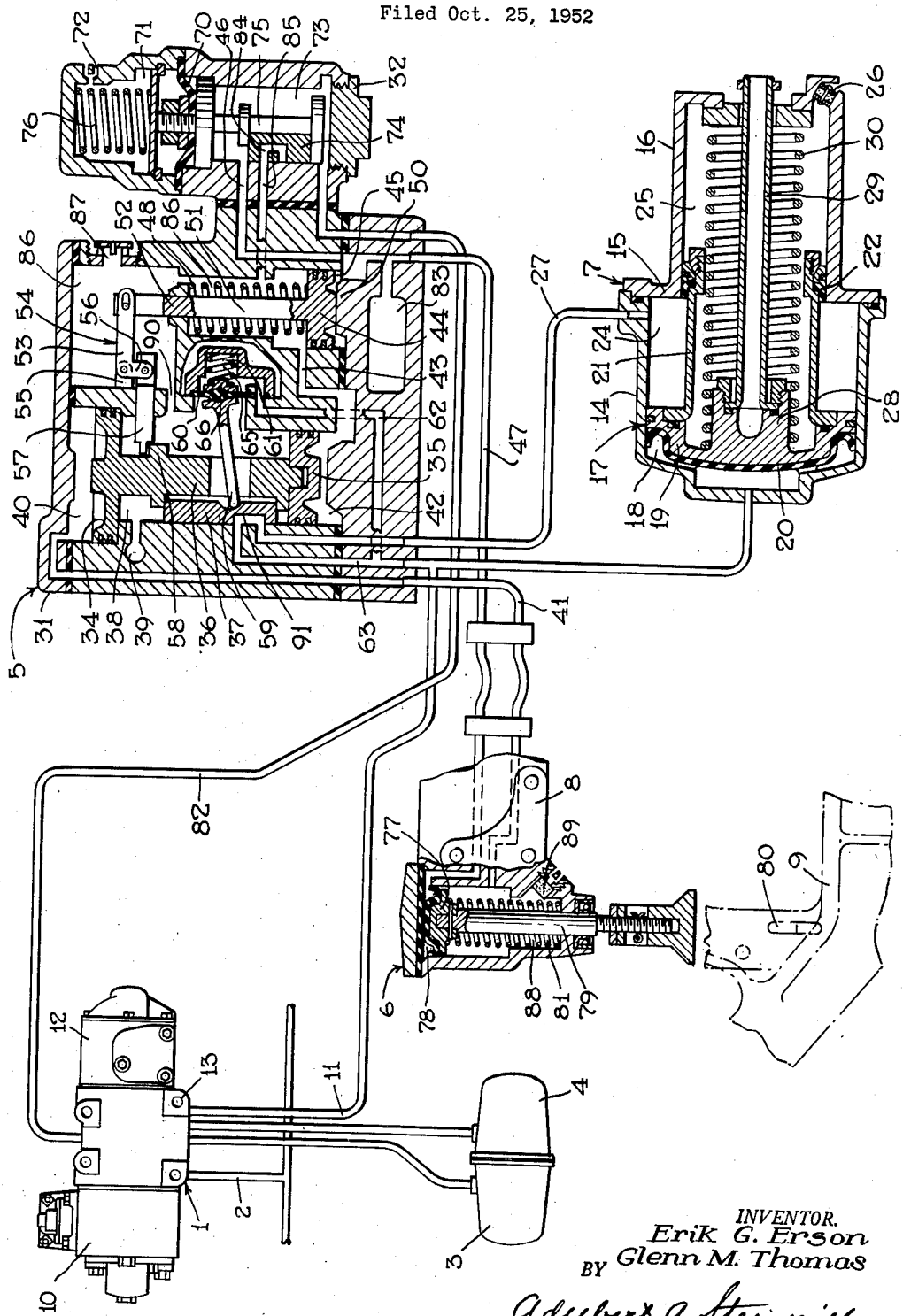

2,830,849

EMPTY AND LOAD FLUID PRESSURE BRAKE APPARATUS

Erik G. Erson, Export, and Glenn M. Thomas, Irwin, Pa., assignors to Westinghouse Air Brake Company, Wilmerding, Pa., a corporation of Pennsylvania Application October 25, 1952, Serial No. 316,862

2 Claims. (Cl. 303—22)

This invention relates to empty and load brake equipment and more particularly to the fluid pressure type which is adapted to be automatically changed over or conditioned for either empty or load braking of a vehicle according to variations in the weight of lading carried thereby.

The principal object of the invention is to provide an improved empty and load brake equipment of the above mentioned type.

Another object of the invention is to provide an empty and load brake apparatus which may be readily and economically combined with parts of a single capacity fluid pressure brake equipment to convert such an equipment into an empty and load brake equipment.

This object is attained by connecting an improved empty and load brake apparatus to the usual brake cylinder supply and release communication leading from the brake controlling valve device of a single capacity brake equipment; by providing a control communication from the brake pipe to the empty and load brake apparatus; and by employing, in place of the usual single pressure chamber brake cylinder device, a brake cylinder device having a main pressure chamber at one side of a brake cylinder piston open to said communication and a compensating pressure chamber at the opposite side, pressure in which is controlled by said apparatus, to provide a braking force equal to the difference in effect of the fluid pressures in said chambers acting on the piston.

A further object of the invention is to provide an improved fluid pressure empty and load brake equipment which, when the brake pipe pressure is increased during charging, will be automatically conditioned or changed over for either empty or load braking according to the load on the vehicle, and which, when the brake pipe pressure exceeds a predetermined limit, will be maintained in its conditioned state so long as the brake pipe pressure is not reduced below said predetermined limit.

Other objects and advantages will appear in the following more detailed description of the invention.

Description

As shown in the drawing, the empty and load fluid pressure brake apparatus comprises a brake controlling valve device 1 to which is connected the usual brake pipe 2, auxiliary reservoir 3, emergency reservoir 4, an empty and load change-over valve apparatus or mechanism 5, a strut device 6 and a brake cylinder device 7, the strut device being mounted on any suitable sprung truck part of a vehicle, such as a truck bolster 8, which is movable vertically relative to the truck wheels (not shown) supporting an unsprung spring plank 9, the other above enumerated devices and said mechanism being mounted on the body of the vehicle.

The brake controlling valve device 1 shown in the drawing, merely for the purpose of illustration, is of the "AB" type, which may be of substantially the same construction and have the same operating characteristics as the "AB" valve mechanism fully described in Patent No. 2,031,213, issued to Clyde C. Farmer on February 18, 1936, and in view of this it is deemed unnecessary to show and describe said valve device in detail.

Briefly, however, the brake controlling valve device 1 comprises a service portion 10 adapted to operate upon both a service and emergency reduction in pressure of fluid in brake pipe 2 for supplying fluid under pressure from the auxiliary reservoir 3 to a brake cylinder pipe 11 and thence to the brake cylinder device 7 for, upon a service reduction in brake pipe pressure, effecting a service application of the brakes on the vehicle. The brake controlling valve device 1 also comprises an emergency portion 12 which is adapted to operate only upon an emergency reduction in pressure of fluid in brake pipe 2 for supplying fluid under pressure from the emergency reservoir 4 to pipe 11 and thence to brake cylinder device 7, wherein such pressure, in addition to that provided from the auxiliary reservoir 3 by operation of the service portion 10, is adapted to operate the brake cylinder device 7 for effecting an emergency application of the brakes on the vehicle. Upon recharging of brake pipe 2, the brake controlling valve device 1 is adapted to operate to open pipe 11 to atmosphere for releasing fluid under pressure therefrom and the brake cylinder device 7 for releasing the brakes on the vehicle and at the same time to effect recharging of the auxiliary reservoir 3 and emergency reservoir 4, as well known. The service and emergency portions 10 and 12, respectively, of the brake controlling valve device 1 are mounted on opposite faces of a pipe backet 13 to which all pipe connections to said valve device are made, as shown in the drawing.

The brake cylinder device 7 comprises a hollow cup-shaped casing 14 to the open end of which is secured an annular pressure head 15 from which projects a hollow cup-shaped non-pressure head 16. A brake cylinder piston 17 is slidably mounted in the casing 14 and at one or the front side thereof is the usual or main pressure chamber 18, to which the pipe 11 is connected. The brake cylinder piston 17 comprises a piston head 19 to one face of which is connected a flexible packing cup 20 for preventing leakage of fluid under pressure from the pressure chamber 18 to the opposite side of the piston. Secured at one end to and projecting from the piston 17 in a direction away from the pressure chamber 18 is a hollow stem 21, the opposite end of which is provided with a ring packing 22 slidable in the non-pressure head 16 for preventing leakage of fluid under pressure from a compensating pressure chamber 24 formed around said stem between the pressure head 15 and the piston 17, to a non-pressure chamber 25 formed within said stem and open to the interior of the non-pressure head 16 and thence to atmosphere through a port 26 in said non-pressure head. The chamber 24 is open to a pipe 27 through which fluid under pressure is adapted to be supplied to and released from said chamber by operation of the brake cotolling valve device 1 and the change-over valve mechanism 5 in a manner hereinafter described.

The piston head 19 is provided with a hollow boss 28 projecting into the hollow stem 21 in coaxial relation to said head and stem, and one end of a hollow rod 29 is secured in said boss. The rod 29 extends through the non-pressure chamber 25 and a bore provided in the outer end of the non-pressure head 16 to the exterior thereof, said rod being hollow to accommodate the usual push rod (not shown) for connecting the piston 17 to the brake rigging (not shown) of a vehicle. Encircling the hollow rod 29 is a brake cylinder piston release spring 30, one end of which bears against the piston head 19 for moving the brake cylinder piston 17 to its brake release position, in which it is shown in the drawing. The opposite end of the release spring 30 is supported on the non-pressure head 16.

The change-over valve mechanism 5 comprises an empty and load change-over valve device 31 which conditions the equipment for either empty or load braking, and a change-over control or cut-off valve device 32, which controls the operation of the strut device 6 to effect the operation of the change-over valve device to either an empty braking position or a load braking position and to render said change-over valve device unchangeable from one position to the other so long as the brake pipe pressure is in excess of a predetermined limit.

The change-over valve device 31 comprises a casing in which there are operatively mounted two differential area, spaced apart pistons 34 and 35 rigidly connected together by means of a stem 36 and adapted to actuate a change-over slide valve 37 contained in a chamber 38 located between the pistons and connected through a passage 39 to the atmosphere. The piston 34 is of greater diameter than the piston 35 and at its outer face is a chamber 40 which is connected through a passage and pipe 41 to the strut device 6. At the outer face of the smaller piston 35 is a chamber 42 which is connected to a passage 43, the pressure of fluid in which passage is adapted to be controlled by a piston valve 44. At one side of the piston valve 44 is a chamber 45 which is connected to a control passage 46 leading to the change-over control valve device 32, said passage being also connected to a pipe 47 leading to the strut device 6. At the other side of the piston valve 44 and interposed between and engaging said piston valve and the casing is a spring 48 which, at all times, urges the piston valve 44 toward a stop 50 integral with the casing, as shown in the drawing.

The piston valve 44 is provided with a stem 51 which is slidably guided in the casing and which at its outer end has secured thereto an extension 52. The outer end of this extension is operatively connected to an arm 53 of a bell crank lever 54 pivotally carried by a bracket 55 which may be integral with the casing, the other arm 56 of said lever being operatively connected to one end of a locking bolt or member 57 slidably mounted in the casing. This locking member extends into the change-over valve chamber 38 and is adapted to engage a lug 58, carried by the stem 36, to lock the stem against movement as will appear below.

Contained in the change-over slide valve chamber 38 is a loading strut 59 which, at one end, pivotally engages the rear face of the change-over slide valve 37 within a suitable recess provided in the valve, and which, at its other end, rockably contacts one side of a flexible diaphragm 60 mounted in the casing. At the other side of the diaphragm 60 is a chamber 61 which is connected through a passage 62 and a passage 63 to the brake cylinder pipe 11. Contained in the chamber 61 is a spring 65 which is interposed between and engages the casing and a follower 66 in contact with the diaphragm 60. The purpose of the spring 65 is to maintain the strut 59 in contact with the slide valve 37 and in turn hold said valve in engagement with its seat against unintentional vibration, but is not intended to load the valve to any appreciable extent. As will appear later, this particular loading is accomplished by means of fluid under pressure which is adapted to be supplied to the diaphragm chamber 61.

The change-over control valve device 32 may comprise a casing in which there is mounted a flexible diaphragm 70, at one side of which is a chamber 71 which is constantly connected through a passage 72 with the atmosphere, and at the opposite side of which is a valve chamber 73 containing a slide valve 74, which is adapted to be operated by a stem or follower 75 operatively secured to said flexible diaphragm. Contained in the chamber 71 is a helical spring 76 which at all times urges the diaphragm 70, stem 75 and slide valve 74 toward the position in which they are shown in the drawing; said spring 76 being suitably caged to limit the extent of its expansion in the direction of chamber 73, to facilitate assembly of device 32.

The strut device 6, carried by the sprung portion 8 of a vehicle above the unsprung portion 9, will be spaced away from said unsprung portion a distance which varies according to the degree of load on the vehicle.

The strut device 6 comprises a casing containing a vertically movable piston 77 at the upper side of which is a pressure chamber 78 constantly open to pipe 47 and also adapted to be opened by piston 77 to pipe 41 in a lowermost position of said piston. Projecting downwardly from the lower side of the piston 77 is a rod 79 terminating outside the casing above a stop 80 mounted on the unsprung portion 9 of the vehicle. A spring 81 contained in the casing of the device acts on piston 77 for urging it upwardly into the position in which it is shown in the drawing.

When the vehicle is empty, the strut device 6 will occupy a position relative to the unsprung portion 9 such as is shown in the drawing and in which position downward movement of the piston 77 will be limited by contact with the casing and not by engagement of piston rod 79 with the stop 80 on the unsprung vehicle portion 9. In this lowermost position of piston 77 chamber 78 will be opened to pipe 41. When the vehicle is loaded, the strut device 6 will assume a lower position relative to the unsprung portion 9 so that downward movement of piston 77 will be so limited by engagement of rod 79 with the stop 80 on the unsprung portion 9 as not to open chamber 78 to pipe 41 leading to chamber 40 in change-over valve device 31.

*Operation*

In initially charging the brake equipment, fluid under pressure supplied to brake pipe 2 flows to the brake controlling valve device 1 and through said device to the auxiliary and emergency reservoirs 3 and 4, respectively, in the usual manner.

Fluid under pressure also flows from the brake pipe through the valve device 1 to a charging or change-over pipe 82 and thence to the slide valve chamber 73 of the change-over control valve device 32. In accordance with the usual practice, this pipe 82 is constantly open to the brake pipe 2 by way of an air strainer (not shown) in the valve device 1. With the change-over control slide valve 74 in its innermost position, as shown, fluid under pressure flows from valve chamber 73 through passage 46 to latch piston chamber 45 in the control valve device 31, to a volume reservoir 83 and to the strut piston chamber 78 by way of pipe 47 which is connected to passage 46. When the pressure of fluid in piston chamber 78 has been increased to about thirteen pounds, for example, the piston 77 and thereby the push rod 79 will move downwardly against the opposing pressure of the spring 81.

If the vehicle is empty, the strut piston 77 will thus move downwardly into contact with its casing; the push rod 79 remaining out of contact with the stop 80. Fluid under pressure will then flow from the strut piston chamber 78 through pipe and passage 41 to piston chamber 40 of the change-over valve device 31.

When the pressure of fluid in the latch piston chamber 45 has been increased to about twenty pounds, the piston 44 will move upwardly against the pressure of spring 48. As passage 43 is uncovered by this movement of the piston 44, fluid under pressure will flow from chamber 45 through said passage to piston chamber 42 of the change-over valve device 31. Also, as the piston 44 is thus moved, bell crank lever 54 is rocked in a counter-clockwise direction, and, as it is thus rocked, it draws the locking bolt 57 out of the path of movement of lug 58 on the piston stem 36. If the change-over valve device 31 happens to be in load position, which will be hereinafter described, when the bolt 57 is moved out of locking engagement with the lug 58, the fluid pressure in piston chamber 40 acting on the face of the larger piston 34 will move the piston assemblage and slide valve 37 to an empty position, in which it is shown in the drawing, against the opposing fluid pressure acting on the face of the smaller piston 35. Should the piston assemblage and the slide valve 37 be in empty position, as shown in the drawing, when the locking bolt 57 is withdrawn, there may, of course, be no movement with the vehicle empty, as assumed.

When the pressure of fluid in valve chamber 73 of the cut-off valve device 32 has been increased to around thirty pounds, the diaphragm 70 will be deflected upwardly against the pressure of spring 76, said diaphragm acting through the medium of the stem 75 to shift the slide valve 74 outwardly to the position in which it is shown in the drawing, in which position a cavity 84 in the valve connects passage 46 to a passage 85, which leads to a chamber 86 at the outer face of piston 44 and thence to an atmospheric port 87. With this connection thus established, fluid under pressure flows from the connected piston chambers 42 and 45, volume reservoir 83 and the piston chamber 78 of the strut cylinder device 6 to atmosphere. When, due to this flow, the pressure of fluid in piston chamber 45 has reduced to slightly less than the pressure of spring 48 (twenty pounds), said spring will act to shift piston 44 downwardly to engagement with stop 50, in which position passage 43 is cut off from chamber 45 and connected to atmosphere through chamber 86 and port 87. As the piston 44 is thus moved, it will actuate the bell crank lever 54 to advance the bolt 57 into position for locking engagement with lug 58 carried by stem 36, thus confining pistons 34 and 35 and slide valve 37 in empty position, as shown in the drawing.

When, due to flow of fluid under pressure from piston chamber 78 to the atmosphere, the pressure of fluid in said chamber has reduced to slightly below the value of spring 81 (thirteen pounds), said spring will move the piston 77 to its uppermost position as shown in Fig. 1. The piston 77, after it has moved a short distance toward its uppermost position will cut off the communication between piston chamber 78 and pipe 41 and then connect pipe 41 to a spring chamber 88 at the lower side of said piston and consequently to atmosphere through a vent port 89, so that fluid under pressure in chamber 40 of the change-over valve device 31 will flow to atmosphere through passage and pipe 41, chamber 88 and port 89. With the pressure of fluid in both chambers 40 and 42 reduced to atmospheric pressure, the bolt 57, which has been moved into locking position, will prevent shifting of pistons 34 and 35 and slide valve 37 from their empty position, as will be apparent.

In initial charging of the brake equipment the brake controlling valve device 1 will open the brake cylinder pipe 11 and thereby the main pressure chamber 18 of the brake cylinder device 7 to the atmosphere, while with the change-over valve device 31 adjusted to empty position, as above described, the compensating chamber 24 in the brake cylinder device will be connected to the atmosphere through pipe and passage 27, a cavity 91 in the slide valve 37, passage 63 and pipe 11 whereby the brakes on the vehicle will be released.

*Operation of the brakes on an empty vehicle*

When it is desired to effect an application of the brakes, the brake pipe pressure will be reduced in the usual manner, causing the brake controlling valve device 1 to supply fluid under pressure from the auxiliary reservoir 3 or both said reservoir and the emergency reservoir 4 to the pipe 11. Fluid under pressure thus supplied to pipe 11 will flow to the main pressure chamber 18 of the brake cylinder device 7, and will also flow through the passage 63 to cavity 91 in the change-over slide valve 37 and diaphragm chamber 61. The pressure of fluid thus provided in chamber 61 will act through the medium of the diaphragm 60 and strut 59 to maintain the slide valve 37 in close contact with its seat against the tendency of fluid at brake cylinder pressure in cavity 91 to raise the valve from its seat, thus insuring against leakage of brake cylinder fluid to chamber 38 which is open to atmosphere by way of an opening 90, chamber 86 and the vent port 87. The fluid under pressure thus supplied through passage 63 to cavity 91 in slide valve 37 will flow through passage and pipe 27 to compensating chamber 24 in the brake cylinder device 7. With the same degree of fluid pressure in main pressure chamber 18 and in compensating chamber 24 of the brake cylinder device 7 the brakes in the empty vehicle, for a given reduction in pressure of fluid in the brake pipe 2, will therefore be applied to a degree limited by the differential in forces developed by the substantially equal pressures in chambers 18 and 24 acting on the different opposing effective areas of the brake cylinder piston 19.

When it is desired to effect a release of the brakes, the brake pipe pressure will be increased in the usual manner causing the brake controlling valve device 1 to establish communication from the brake cylinder pipe 11 to atmosphere, thus venting main pressure chamber 18 to atmosphere. Compensating chamber 24 will be connected to atmosphere through pipe and passage 27, cavity 91, passage 63 and pipe 11 likewise.

*Change-over operation of the equipment on a loaded car*

When the car is carrying a load, the distance between the bottom of piston rod 79 and the upper surface of the stop 80 will be such, due to the compression of the truck springs, that when fluid under pressure is supplied to the piston chamber 78 of the strut device 6, in charging the equipment either initially or subsequent to substantial complete venting of brake pipe 2, the strut device piston 77 will be brought to a stop before it can connect chamber 78 to pipe 41, and pipe 41 will therefore remain connected to atmosphere through spring chamber 88 and vent port 89.

When the pressure of fluid in chamber 45 has been increased to about twenty pounds the piston 44 will cause the bell crank lever 54 to draw the bolt 57 out of locking relation with the lug 58. The piston 44 in its traverse will connect chamber 45 to passage 43 so that fluid under pressure will flow from chamber 45 to chamber 42. With piston chamber 40 open to atmosphere through passage and pipe 41, chamber 88 and port 89, and the locking bolt 57 out of locking relation with the lug 58, fluid under pressure in chamber 42 acting on piston 35, will cause the pistons 34 and 35, piston stem 36 and slide valve 37 to move in the direction of piston 34, that is, from empty position to load position.

When the pressure of fluid in slide valve chamber 73 of the change-over control valve device 32 exceeds thirty pounds, the diaphragm 70 will deflect outwardly causing slide valve 74 to be shifted to the position in which cavity 84 again connects passage 46 to passage 85 leading to atmosphere through chamber 86 and port 85, so that fluid under pressure will be vented from the presently connected chambers 42 and 45, volume reservoir 83, and from the piston chamber 78. With chamber 45 thus vented to atmosphere, spring 48 will be permitted to move the piston 44 into contact with the stop 50. In this movement the piston 44 through the medium of the bell crank 54 will actuate the bolt 57 into locking relation with the lug 58. This time, however, lug 58 will be positioned above the bolt 57. With piston chamber 78 vented to atmosphere the spring 88 will return piston 77 to its normal position in which it is shown in the drawing.

*Operation of the brakes on a loaded vehicle*

When the brake controlling valve device 1 operates to supply fluid under pressure to brake cylinder pipe 11, fluid under pressure will flow to main pressure chamber 18 in the brake cylinder device 7 to act on the main area of piston 19 in the usual manner. With slide valve 37 in its upper or load position, passage and pipe 27 is open to chamber 38 which is open to atmosphere through vent port 39. Consequently fluid in chamber 24 will be at atmospheric pressure and will remain so as piston 19 moves outwardly to apply the brakes, and the brakes on the vehicle will be applied to a degree governed solely by the pressure of fluid in chamber 18 acting on piston 19.

When it is desired to release the brakes on the vehicle, fluid under pressure will be released from the brake cylinder pipe 11 and main pressure chamber 18 by operation of the brake controlling valve device 1 in response to recharging of the brake pipe 2. Upon release of fluid under pressure from chamber 18 the spring 30 will return the brake cylinder piston to its brake release position, in which it is shown in the drawing.

*Summary*

From the foregoing, it will be seen that I have provided an improved fluid pressure brake apparatus of the type employing a load compensating brake cylinder device having opposing pressure chambers, which apparatus is adjustable upon charging the usual brake pipe with fluid under pressure to provide, upon subsequently effecting an application of brakes, either a chosen degree of braking for an empty vehicle or a greater degree of braking for a loaded vehicle.

Having now described our invention, what we claim as new and desire to secure by Letters Patent, is:

1. In an empty and load brake apparatus for a vehicle, the combination of a brake pipe, a brake cylinder comprising differential piston means subject to fluid pressure in a main chamber opposing fluid pressure in a compensating chamber acting over a smaller effective area of said differential piston means than that on which the pressure in the main chamber acts for providing one braking ratio or a greater braking ratio according as both of said chambers are charged or only the main chamber is charged with fluid under pressure, a first conduit constantly connected to the main chamber, a second conduit constantly connected to the compensating chamber, brake controlling means responsive to a reduction in brake pipe pressure to supply fluid under pressure to said first conduit and responsive to a subsequent increase in brake pipe pressure to release fluid under pressure from said first conduit, a changeover device comprising valve means and two opposed pistons of different areas having respective pressure chambers, said valve means being operable by said pistons to one position responsively to supply of fluid under pressure concurrently to both of said pressure chambers and effective in said one position to connect a branch of said first conduit to said second conduit, and being operable by said pistons to a second position responsively to supply of fluid under pressure to one of said pressure chambers but not to the other of said pressure chambers and effective in said second position to blank off said branch of said first conduit from said second conduit and vent the latter, a third conduit, fluid pressure actuated means responsive to charging of said third conduit to supply fluid under pressure to or vent fluid under pressure from said other pressure chamber according to whether the weight of the load carried by the vehicle is less than or exceeds a predetermined amount, second valve means responsive to charging of said third conduit to supply fluid under pressure to said one pressure chamber irrespective of the weight of the load carried by the vehicle, and cut-off valve means controlled by brake pipe pressure and operative to connect said third conduit to said brake pipe or to atmosphere according to whether brake pipe pressure is less than or exceeds a preselected value which is higher than the values of pressure in said third conduit at which said fluid pressure actuated means and said second valve means are actuated.

2. In an empty and load brake apparatus for a vehicle, the combination of a brake pipe, a brake cylinder comprising first differential piston means subject to fluid pressure in a main chamber opposing fluid pressure in a compensating chamber acting over a smaller effective area of the piston means than that over which the pressure in the main chamber acts for providing one braking ratio or a greater braking ratio according as both of said chambers are charged or only the main chamber is charged with fluid under pressure, a first conduit constantly connected to the main chamber, a second conduit constantly connected to the compensating chamber, brake controlling means responsive to a reduction in brake pipe pressure to supply fluid under pressure to said first conduit and responsive to a subsequent increase in brake pipe pressure to release fluid under pressure from said first conduit, change-over mechanism comprising valve means and a second differential piston means for operating said valve means, said second differential piston means having two working spaces of unequal effective areas and being moved to one position responsively to charging of both of said working spaces in which one position said valve means connects a branch of said first conduit to said second conduit and being moved to a second position responsively to charging of the smaller of said working spaces while the larger of said working spaces is vented, in which second position said valve means blanks off said branch of said first conduit from said second conduit and connects said second conduit to atmosphere, a third conduit, fluid pressure actuated means responsive to venting of said third conduit to vent said larger working space and responsive to charging of said third conduit to supply fluid under pressure from said third conduit to or vent the larger working space according to whether the weight of the load carried by the vehicle is less than or exceeds a predetermined amount, locking means, means biased to a locking position when said third conduit is vented for venting the smaller working space and causing said locking means to lock said valve means against movement and operative to an unlocking position upon an increase in pressure in said third conduit to a chosen value above atmosphere for supplying fluid under pressure from said third conduit to the smaller working space and causing said locking means to move to a different position in which it unlocks said valve means for movement, and cut-off valve means controlled by brake pipe pressure and operative to connect said third conduit to said brake pipe or to atmosphere according to whether brake pipe pressure is less than or exceeds a preselected value higher than said chosen value.

References Cited in the file of this patent

UNITED STATES PATENTS

| | | |
|---|---|---|
| 2,364,927 | Sudduth | Dec. 12, 1944 |
| 2,528,143 | Hewitt | Oct. 31, 1950 |
| 2,575,943 | Cook et al. | Nov. 20, 1951 |